United States Patent
Weiβ et al.

(10) Patent No.: US 10,605,699 B2
(45) Date of Patent: Mar. 31, 2020

(54) METHOD FOR DETECTING A DEFECTIVE DAMPER DEVICE OF A VEHICLE

(71) Applicant: Dr. Ing. h.c. F. Porsche Aktiengesellschaft, Stuttgart (DE)

(72) Inventors: Alexander Weiβ, Wilnsdorf (DE); Günter Poetsch, Mühlacker (DE); Nils Kallert, Stuttgart (DE); Markus Gantikow, Koenigsbach-Stein (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 187 days.

(21) Appl. No.: 15/977,478

(22) Filed: May 11, 2018

(65) Prior Publication Data

US 2018/0356312 A1    Dec. 13, 2018

(30) Foreign Application Priority Data

Jun. 8, 2017    (DE) .................. 10 2017 112 625

(51) Int. Cl.
  *G01M 17/04*    (2006.01)
  *B60G 17/0185*    (2006.01)

(52) U.S. Cl.
  CPC ......... *G01M 17/04* (2013.01); *B60G 17/0185* (2013.01); *B60G 2400/102* (2013.01);
  (Continued)

(58) Field of Classification Search
  CPC ............. G01M 17/04; B60G 17/0185; B60G 2800/70; B60G 2800/916; B60G 2401/14;
  (Continued)

(56) References Cited

U.S. PATENT DOCUMENTS

| | | | | |
|---|---|---|---|---|
| 5,444,621 A | * | 8/1995 | Matsunaga | ........ B60G 17/0165 280/5.518 |
| 5,648,902 A | * | 7/1997 | Honda | ............... B60G 17/0165 701/1 |

(Continued)

FOREIGN PATENT DOCUMENTS

| DE | 4440413 A1 | 5/1996 |
|---|---|---|
| DE | 19651162 A1 | 1/1998 |

(Continued)

OTHER PUBLICATIONS

German Search Report for German Application No. 10 2017 112 625.2, dated Feb. 14, 2018, with partial English translation—8 pages.

*Primary Examiner* — Freddie Kirkland, III
(74) *Attorney, Agent, or Firm* — RatnerPrestia

(57) ABSTRACT

A method for detecting a defective damper device of a vehicle, including the following steps: monitoring the specific damper travel values (DW) of at least two wheel carriers of the vehicle in a monitoring period (UZ), determining the specific damper speeds (DG) and the specific damper accelerations (DB) on the basis of the monitored specific damper travel values (DW) in the monitoring period (UZ), acquiring the specific damper work values (DA) on the basis of the determined specific damper speeds (DG) and on the basis of the determined specific damper accelerations (DB), generating a comparison result (VE) from a comparison of the acquired specific damper work values (DA) with one another, and generating at least one specific status signal (SS) on the basis of the comparison result (VE) for the at least two wheel carriers.

9 Claims, 4 Drawing Sheets

(52) U.S. Cl.
CPC .... *B60G 2400/20* (2013.01); *B60G 2400/252* (2013.01); *B60G 2400/821* (2013.01); *B60G 2401/14* (2013.01); *B60G 2600/042* (2013.01); *B60G 2600/08* (2013.01); *B60G 2800/70* (2013.01); *B60G 2800/916* (2013.01)

(58) Field of Classification Search
CPC .......... B60G 2400/821; B60G 2600/08; B60G 2400/102; B60G 2400/20; B60G 2400/252; B60G 2600/042
See application file for complete search history.

(56) References Cited

U.S. PATENT DOCUMENTS

| | | | |
|---|---|---|---|
| 5,756,877 A * | 5/1998 | Nozaki | G01M 17/04 73/11.08 |
| 6,360,580 B1 * | 3/2002 | Muller | G01M 17/04 73/11.04 |
| 7,191,637 B2 | 3/2007 | Sonnenburg | |
| 7,512,520 B2 * | 3/2009 | Sack | B60G 17/019 701/37 |
| 8,116,938 B2 * | 2/2012 | Itagaki | B60G 17/0182 280/5.515 |
| 9,963,006 B2 * | 5/2018 | Kubota | B60G 17/0165 |
| 2004/0148074 A1 * | 7/2004 | Hessmert | B60G 17/0185 701/38 |
| 2017/0032592 A1 * | 2/2017 | Lu | G07C 5/0808 |
| 2019/0102959 A1 * | 4/2019 | Saylor | G07C 5/0825 |

FOREIGN PATENT DOCUMENTS

| | | |
|---|---|---|
| DE | 10258265 A1 | 8/2003 |
| DE | 102004021131 B3 | 10/2005 |
| DE | 102012218780 A1 | 4/2014 |

* cited by examiner

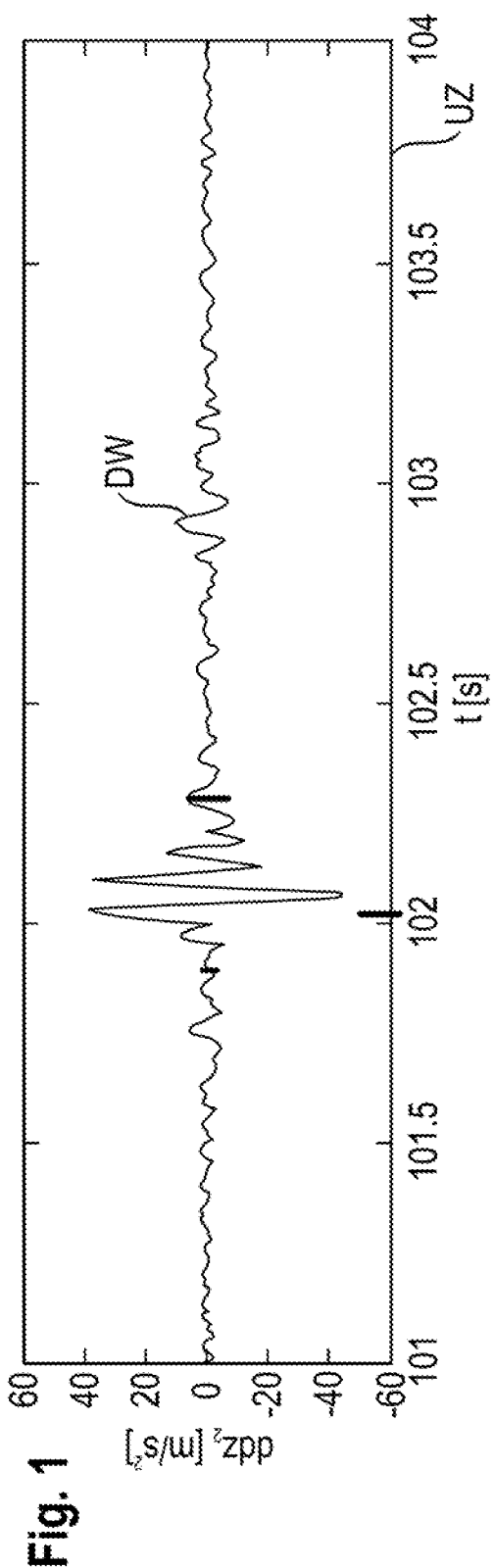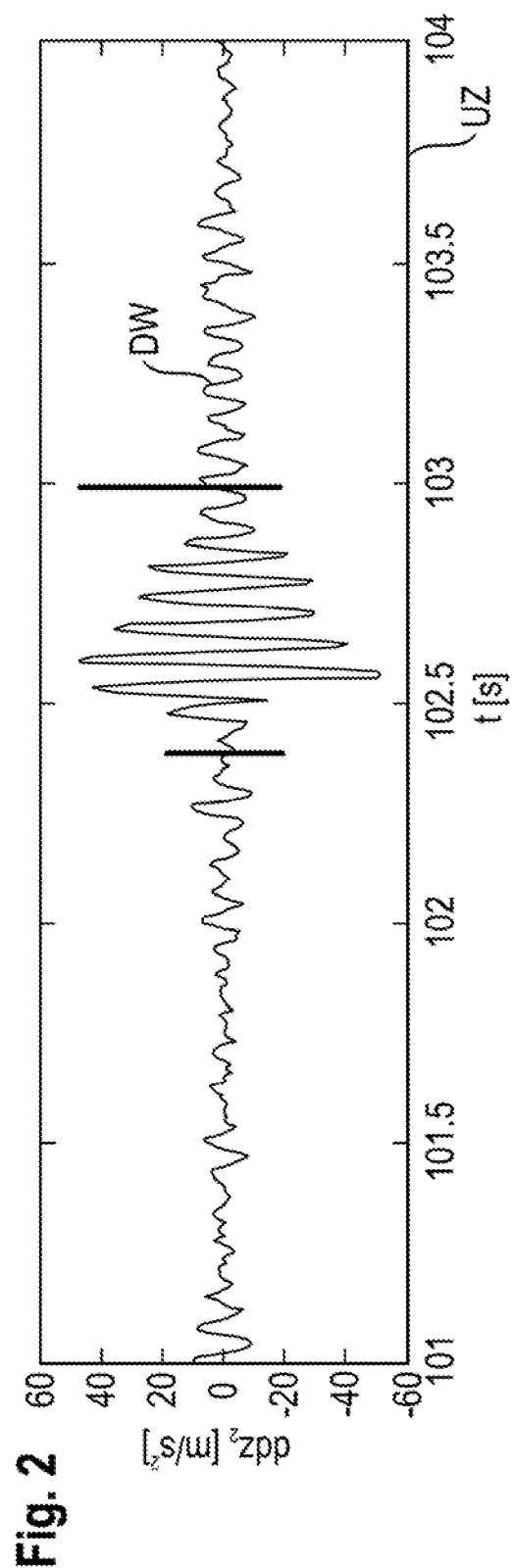

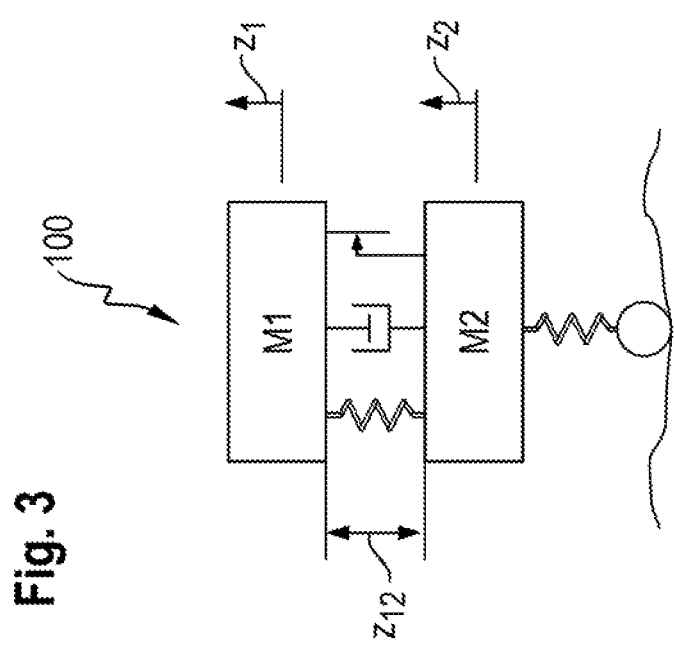

METHOD FOR DETECTING A DEFECTIVE DAMPER DEVICE OF A VEHICLE

CROSS-REFERENCE TO RELATED APPLICATION

This application claims priority to German Patent Application No. DE 10 2017 112 625.2, filed Jun. 8, 2017, which is incorporated by reference herein in its entirety.

FIELD OF THE INVENTION

The present invention relates to a method for detecting a defective damper device of a vehicle and to a detection device for detecting a defective damper device of a vehicle.

BACKGROUND OF THE INVENTION

It is known that vehicles are equipped with damper devices in order to be able to ensure a defined driving behavior, in particular a particularly stable and comfortable driving behavior for the vehicle. The dampers serve to influence the spring-compression and the spring-extension behavior of the spring devices of the vehicle, and in particular to slow down this spring compression or spring extension. The respective damping characteristic is a decisive determining factor of the driving behavior of the vehicle here.

A disadvantage in the known solutions is that technical defects in the damper devices can only be acquired with difficulty. For example, a defective damper can be detected, in particular, when it becomes apparent in the driving behavior. However, relatively small defects or partial defects in the damper device which are virtually imperceptible, or not perceptible at all, in the normal driving mode but rather are perceptible only in extreme situations, that is to say in severe spring compression situations, are conceivable. In order to ensure that such partial defects or relatively small defects of the damper device also become perceptible, correspondingly frequent maintenance intervals are necessary. On the basis of the known solutions, relatively frequent visits to a workshop are conceivable, which visits can give rise to increased deactivation times of the vehicle and to increased costs.

SUMMARY OF THE INVENTION

An object of the present invention is to at least partially overcome the disadvantages described above. In particular, an object of the present invention is to make available a possible way of detecting a defective damper device of a vehicle in a cost-effective and simple fashion.

According to aspects of the invention, a method is proposed for detecting a defective damper device of a vehicle. Such a method comprises the following steps:

monitoring the specific damper travel values of at least two wheel carriers of the vehicle in a monitoring period, determining the specific damper speeds and the specific damper accelerations on the basis of the monitored specific damper travel values in the monitoring period, acquiring the specific damper work values on the basis of the determined specific damper speeds and on the basis of the determined specific damper accelerations, generating a comparison result from a comparison of the acquired specific damper work values with one another, and generating at least one specific status signal on the basis of the comparison result for the at least two wheel carriers.

A method according to aspects of the invention is based, in particular, on the idea that only or essentially only data which is also already present in the vehicle as a result of measurements is to be used. In the simplest configuration possibility of the present invention this is the respective damper travel value. As soon as a vehicle rolls over an obstacle, the respective wheel carrier is moved relative to the bodywork of the vehicle. This may involve either spring compression or spring extension of the wheel carrier, that is to say either a negative spring movement or a positive spring movement. The spring movement, that is to say the relative movement between the wheel carrier, on the one hand, and the bodywork of the vehicle, on the other, corresponds here to the specific damper travel value which is specific to the respective wheel carrier. Since a high level of inhomogeneity is usually present ahead and respectively behind a vehicle on a roadway, this leads to a situation in which each damper travel value is usually specific to each individual wheel carrier of each wheel on each axle of the vehicle. This damper travel value is therefore specific to the respective wheel carrier and is monitored as a specific damper travel value for each wheel carrier of at least two wheel carriers of the vehicle in a monitoring period.

The monitoring period is embodied, in particular, in a rolling fashion, with the result that it also as it were moves along with the vehicle, and therefore with the comparison step which is to be explained later a rolling comparison with monitored specific damper travel values which have just been passed and the corresponding further parameters of the method can take place.

In a core concept of the present invention, on the basis of the monitored specific damper travel values which have been acquired in this way not only is a specific damper speed determined but also a specific damper acceleration for each of the two at least two monitored wheel carriers. This determination is also carried out by means of the monitoring period and can be made available e.g. in a mathematical fashion by modeling the first and second mathematical derivatives. Therefore, the monitoring of a single parameter in the form of the specific damper travel values for the at least two wheel carriers results in a multiplicity of further specific parameters, to be precise the specific damper speeds and the specific damper accelerations for the monitored wheel carriers.

On the basis of the parameters of the specific damper speeds and the specific damper accelerations it is now possible to acquire, within the scope of the method according to aspects of the invention, specific damper work values which can also be made available again specifically for each individual monitored wheel carrier. In the core concept of the present invention, it is now possible to make an inference in which a comparison result is generated from a comparison of the acquired specific damper work values with one another. As a result of the fact that at least two wheel carriers of the vehicle are monitored within the scope of the present invention, at least two specific damper work values are acquired by means of the acquisition step. These two specific damper work values can be compared with one another. In the simplest case, this comparison result contains a mathematical correlation with respect to the mathematical difference between these two specific damper work values. In the best case, the specific damper work value between two wheel carriers is identical or essentially identical. This means that the same damper movement, and therefore also the same damper work values, have been specifically acquired for both wheel carriers in a spring compression situation, that is to say when a hill on the roadway is traveled over. The comparison result in such a case is 0 or essentially equal to 0. When there are particularly large differences, that is to say in the case of large absolute values for the comparison result between the acquired specific damper work values, it is therefore to be assumed that a large difference has been made available in the damper work value performed at the respective wheel carrier.

A large difference in the damper work value performed leads to a situation in which despite the same roadway underlying surface which has been passed over by the vehicle, a different damper performance has been made available. However, since the boundary conditions, that is to say the vehicle, the weight of the vehicle, the speed of the vehicle and also the surroundings, in particular the roadway underlying surface have not changed, it is possible in this way to infer with a high level of probability that there is a defect in the damper device which has been acquired in this way by the comparison result. In this way it becomes possible to generate, in a last step, a specific status signal which determines the location of the defective damper device on the basis of the comparison result, in each case, at least one of the at least two wheel carriers. It is preferred here if an individual specific status signal is generated for each monitored wheel carrier, with the result that in particular such damper devices or wheel carriers which have a relatively small or the smallest specific damper work value within the scope of the monitoring method are detected as defective by means of the comparison results of the damper work values. In this context it is possible in particular to take as a basis a minimum distance or a minimum difference in absolute value of the comparison result between the individual compared specific damper work values.

It may be advantageous if in one method according to aspects of the invention the step of monitoring for at least two wheel carriers takes place on a common side of the vehicle. On a common side of the vehicle, that is to say on the right-hand side and/or on the left-hand side, it is to be assumed in normal driving style the respective wheel carrier will roll over or pass over the same or essentially the same section of the roadway. It is therefore to be assumed that corresponding unevenesses on the roadway on the same side of the vehicle are also reached by both wheel carriers in a chronologically offset fashion. The comparison with a method according to aspects of the invention to correlate the specific damper work values for one side of the vehicle therefore leads to a situation in which there is also a high level of probability that identical roadway conditions are compared for these two wheel carriers. The quality of a method according to aspects of the invention is in this way significantly improved. It is preferred if the monitoring is carried out in a corresponding way on each side of the vehicle, with the result that a first part of the method is carried out on the first side of the vehicle, and a second part of the method is carried out on the second side of the vehicle. In other words, it is preferred if a side-specific comparison result can be made available by a method according to aspects of the invention.

A further advantage can be achieved if in a method according to aspects of the invention the position of the monitored wheel carriers and the movement speed of the vehicle are taken into account during the generation of the comparison result. In particular, this is relevant if the monitored wheel carriers are located on different axles of the vehicle. If, for example, a first wheel carrier on the front axle of the vehicle is compared with a second wheel carrier on the rear axle of the vehicle, a corresponding unevenness in the roadway, which is detected at the front axle, can be perceived by a change in the damper work value at a chronologically offset time at the rear axle. Taking into account the movement speed therefore offsets the two monitoring periods chronologically with respect to one another, with the result that a locationally or positionally precise comparison becomes possible by means of a method according to aspects of the invention. This permits the defective damper device to be detected as quickly and reliably as possible even in particularly short monitoring periods and therefore with high processing accuracy. In particular in this way the susceptibility of the method to errors can be significantly reduced.

It may also be advantageous if in a method according to aspects of the invention all the wheel carriers of the vehicle are monitored. The extension of a method according to aspects of the invention to the entire vehicle permits all the damper devices of the vehicle to be equipped with a method quality according to aspects of the invention. Advantages of the method and therefore the safety during the operation of the vehicle are therefore also considerably increased.

It is also advantageous if when the specific damper work values are acquired in a method according to aspects of the invention, the mass of the body of the vehicle is estimated and/or is dispersed with. It is particularly preferable if the mass of the vehicle is set to a constant value, in particular to the value equal to 1. By virtue of the fact that the mass of a vehicle can change continuously as a result of a multiplicity of parameters, e.g. as a result of the number of vehicle occupants, as a result of the size of the cargo and also the mass of the operational media, e.g. in the form of fuel, this is basically a variable parameter here. The expenditure on executing a method according to aspects of the invention can be significantly reduced by reducing the acquisition outlay in which the mass of the vehicle body is only estimated or is dispensed with by setting it to a constant value. In particular the need to acquire or determine the mass of the vehicle to carry out the method is dispensed with.

It is also advantageous if in a method according to aspects of the invention the roadway in front of the vehicle is monitored, and specific damper work values which are predicted on the basis of the monitoring result are acquired, wherein the predicted specific damper work values are preferably taken into account during the generation of the comparison result. This is to be understood as meaning that the roadway in front of the vehicle is monitored using a sensor device, e.g. using a camera. In this context, in particular the condition of the roadway in the form of elevated portions and depressions is to be monitored. On the basis of the detected elevated portions and/or depressions it is possible to predict what spring compression behavior and therefore what damper work value is to be expected specifically at the respective monitored wheel carrier. It is therefore possible not only to carry out a comparison according to the present method with the damper work values which have actually been performed, but it is also possible to carry out a comparison with the previously predicted damper work values for the respective wheel carrier. This increases the safety and in particular the predictability of a method according to aspects of the invention even further. In particular, when predicted specific damper work values are used, the positional accuracy is also additionally correlated with the movement speed of the vehicle and the position of the respectively monitored wheel carrier.

It is a further advantage if, with a method according to aspects of the invention, a prediction method for the generation of the predicted specific damper work values is adapted on the basis of the acquired specific damper work values and the specific status signal. In the paragraph above it has been explained how a predicted specific damper work value can be made available using a monitoring device. As soon as it has been detected on the basis of the comparison result that there is no defective damper within the vehicle, it is possible to infer on the basis of the acquired specific damper work values how accurate the prediction was on the basis of the predicted specific damper work values. It is therefore possible to make an inference and to make available an adaptation of the prediction method, with the result that by virtue of a learning effect the predicted specific damper work values lie increasingly close to the acquired specific damper work values of non-defective dampers over the course of the operation of the vehicle. There is therefore feedback in the case of a positive method of operation of the individual damper devices.

It is also advantageous if in a method according to aspects of the invention, a separate specific status signal is generated for each monitored wheel carrier. As has already been explained in the introduction, in this way an even more accurate evaluation can be made available. In particular it is possible to display fundamentally not only the defect of one or more damper devices but also to make available direct determination of the location as to which of the monitored wheel carriers is possibly equipped with a defective damper device. The specific status signal can be embodied both in a qualitative and in a quantitative fashion. It is therefore conceivable for a simple qualitative display to correlate the defective wheel carrier with the defective damper device. On the basis of the acquisition of the absolute value of the comparison result it is also possible to make a qualitative statement as to whether the comparison result includes a large difference or a small difference, and therefore as to which would indicate a relatively large or relatively small defect in the respective damper device.

The subject matter of the present invention is also a detection device for detecting a defective damper device of a vehicle. Such a detection device has a monitoring module for monitoring the specific damper travel values of at least two wheel carriers of the vehicle in a monitoring period. Furthermore, a determining module is provided for determining the specific damper speeds and the specific damper accelerations on the basis of the monitored specific damper travel values in the monitoring period. By using an acquisition module it becomes possible to acquire the specific damper work values on the basis of the determined specific damper speeds and on the basis of the determined specific damper accelerations. By using a generating module it is possible to generate a comparison result from a comparison of the acquired specific damper work values with one another, and for at least one specific status signal on the basis of the comparison result for the at least two wheel carriers. In a detection device according to aspects of the invention, the monitoring module, the determining the module, the acquisition module and/or the generating module are designed, in particular, to execute a method according to aspects of the invention. Therefore, a detection device according to aspects of the invention provides the same advantages as those which have been explained in detail with respect to a method according to aspects of the invention.

BRIEF DESCRIPTION OF THE DRAWINGS

The following figures in the drawings show exemplary embodiments of the present invention in a schematic fashion. In the drawings:

FIG. 1 shows the monitoring of an intact damper,

FIG. 2 shows the monitoring of a defective damper device,

FIG. 3 shows a schematic illustration of a damper device,

FIG. 4 shows an acquisition possibility for specific damper work value,

DETAILED DESCRIPTION OF THE INVENTION

FIGS. 1 and 2 show schematically how damper accelerations can be monitored over a monitoring period UZ. The individual damper travel values DW are illustrated here graphically and form together the specific damper acceleration DB. While FIG. 1 shows rapid spring compression and then a good damping effect, the damper device 100 according to FIG. 2 experiences a spring action or oscillates for a significantly longer period. The longer subsequent oscillation give rise to a worsened driving behavior of the vehicle 200 and indicates a defective or a poorly adjusted damper device. For a method according to aspects of the invention, a damper device 100 of a vehicle 200 on a wheel carrier 210 can be reduced to various mechanical components which are arranged relative to one another. The mass M1 is understood here to be the vehicle body, while M2 in FIG. 3 signifies the mass of the wheel carrier with the connected wheel and rim. In this context, a spring action is already made available in partial regions by the rubber coated configuration of the tire of the vehicle. However, in the approach according to aspects of the invention the correlation composed of the friction, damping and spring action is taken into account and explained here by Z12. According to aspects of the invention, the travel Z12 is then monitored as a specific damper travel value DB at the respective wheel carrier 210 of the damper device 100.

Figure 5:
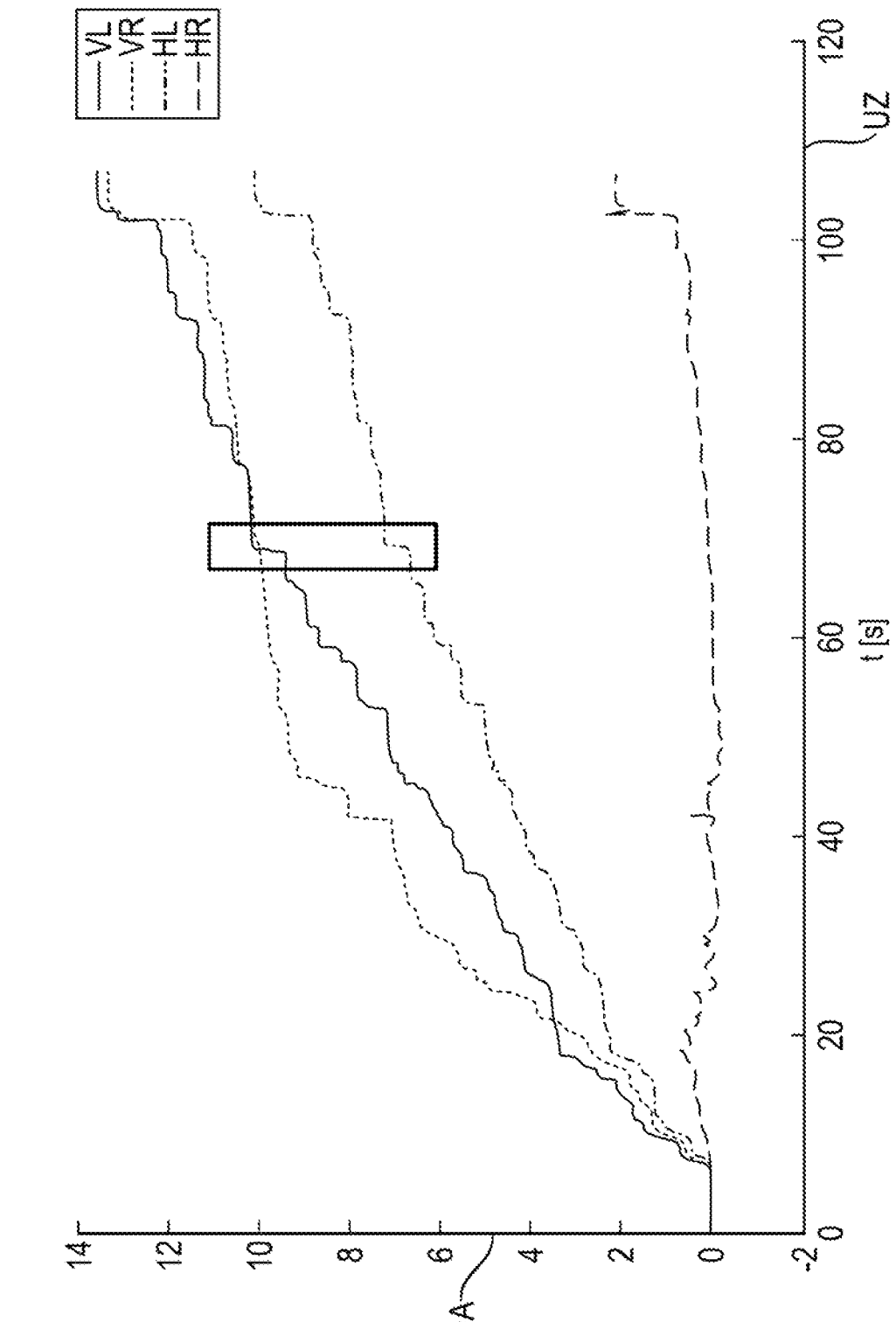
FIG. 5 shows a graphic illustration of the specific damper work values.

FIG. 4 illustrates how the associated mathematical correlation can be derived from FIG. 3. It is therefore possible here to acquire the specific damper work value DA and to apply it, in particular, over the monitoring period UZ, as is shown schematically e.g. by FIG. 5. In FIG. 5 it is apparent that four wheel carriers 210 are monitored here. These are the wheel carriers 210 at the front left VL, front right VR, rear left HL and rear right HR. This is apparent from FIG. 5, one of the three wheel carriers 210 also clearly different with respect to the monitored specific damper work value DA which can be acquired from the specific damper travel value DW on the basis of the specific damper acceleration DB and the specific damper speed DG. It is therefore possible to make a comparison which gives rise to a comparison result VE, with the result that a specific status signal SS can be output for the defective damper device 100.

Figure 6:
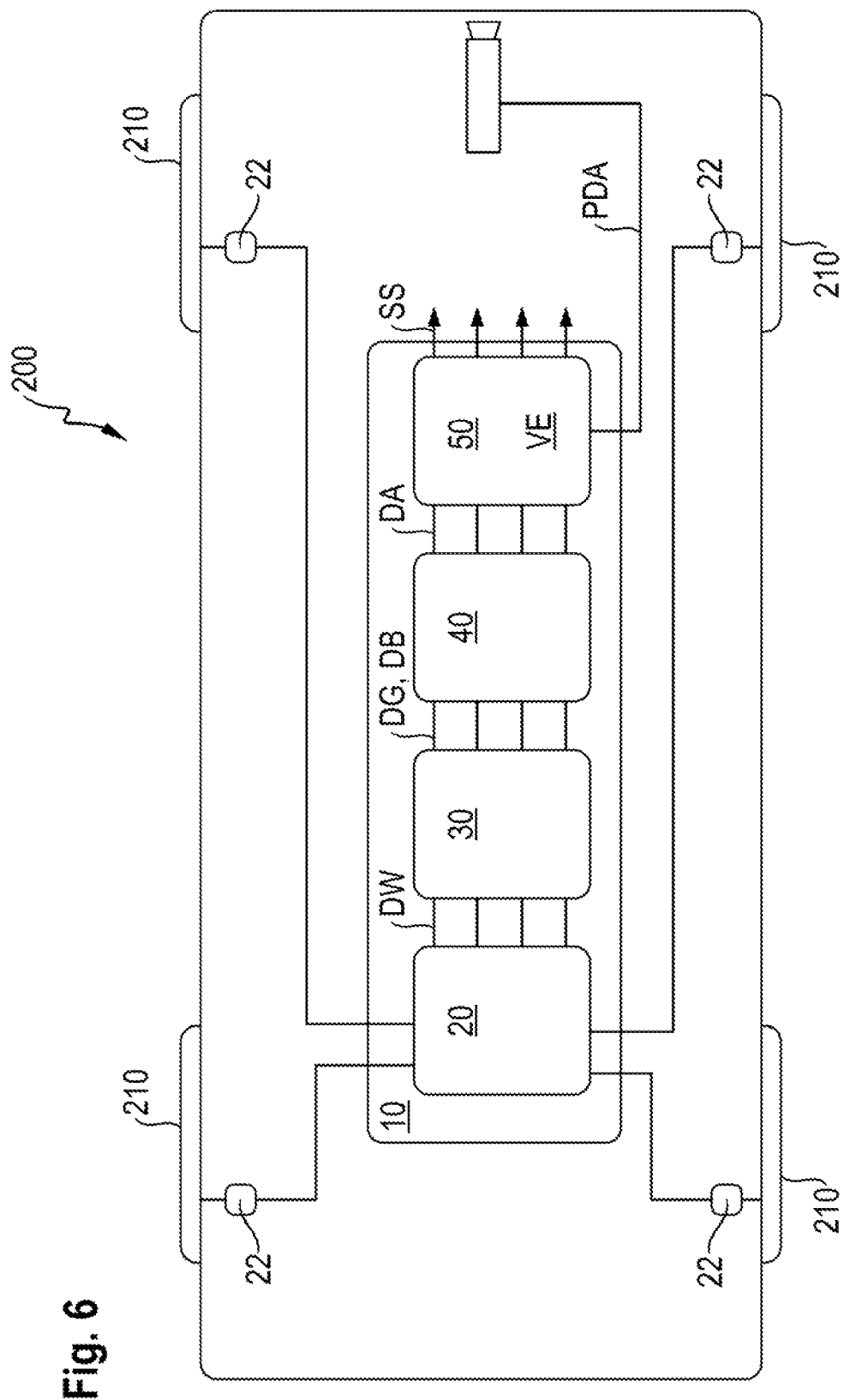
FIG. 6 shows a schematic illustration of a detection device according to aspects of the invention.

FIG. 6 shows schematically how a detection device 10 can be configured in a vehicle 200 with four wheel carriers 210 and corresponding damper devices 100. This detection device 10 is configured with a monitoring module 20 which is able to carry out monitoring of the specific damper travel values DW and to pass them onto a determination module 30. By means of the determination module 30 it is then possible to acquire specific damper speeds DG and specific damper accelerations DB which can be passed onto an acquisition module 40. In the acquisition module 40 it is possible to make available specific damper work values DA for each of the individual wheel carriers 210 in a specific way, with the result that in conclusion a comparison result VE can be generated in the generation module 50. On the basis of the comparison result VE it is possible to make available specific status signals SS with specificity for the individual wheel carriers 210. The individual sensors 22 supply the monitoring possibilities for the specific damper travel values DW here.

Furthermore, FIG. 6 shows that the roadway in front of the vehicle 200 can be monitored using a camera device. By means of this monitoring it becomes possible to make available a predicted specific damper work value PDA and also to use it to carry out the comparison in the generation module 50.

The explanation above of the embodiment describes the present invention exclusively within the scope of examples. Of course, individual features of the embodiments can, where technically appropriate, be combined freely with one another without departing from the scope of the present invention.

What is claimed is:

1. A method for detecting a defective damper device of a vehicle, comprising the following steps:
    monitoring specific damper travel values (DW) of at least two wheel carriers of the vehicle in a monitoring period (UZ),
    determining specific damper speeds (DG) and specific damper accelerations (DB) on the basis of the monitored specific damper travel values (DW) in the monitoring period (UZ),
    acquiring specific damper work values (DA) on the basis of the determined specific damper speeds (DG) and on the basis of the determined specific damper accelerations (DB),
    generating a comparison result (VE) from a comparison of the acquired specific damper work values (DA) with one another, and
    generating at least one specific status signal (SS) on the basis of the comparison result (VE) for the at least two wheel carriers.

2. The method as claimed in claim 1, wherein the step of monitoring for at least two wheel carriers takes place on a common side of the vehicle.

3. The method as claimed in claim 1, wherein when the comparison result (VE) is generated, a position of the monitored wheel carriers and a movement speed of the vehicle are taken into account.

4. The method as claimed in claim 1, wherein all of the wheel carriers of the vehicle are monitored.

5. The method as claimed in claim 1, wherein when the specific damper work values (DA) are acquired, the mass (M1) of the vehicle body is estimated or is dispensed with.

6. The method as claimed in claim 1, wherein a carriageway in front of the vehicle is monitored, and specific damper work values (PDA) which are predicted on the basis of the monitoring result are acquired, wherein the predicted specific damper work values (PDA) are taken into account during generation of the comparison result (VE).

7. The method as claimed in claim 6, wherein a prediction method for the generation of the predicted specific damper work values (PDA) is adapted on the basis of the acquired specific damper work values (DA) and the specific status signal (SS).

8. The method as claimed in claim 1, wherein a separate specific status signal (SS) is generated for each monitored wheel carrier.

9. A detection device for detecting a defective damper device of a vehicle, the detection device comprising:
    a monitoring module for monitoring a specific damper travel values (DW) of at least two wheel carriers of the vehicle in a monitoring period (UZ),
    a determining module for determining specific damper speeds (DG) and specific damper accelerations (DB) on the basis of the monitored specific damper travel values (DW) in the monitoring period (UZ),
    an acquisition module (40) for acquiring specific damper work values (DA) on the basis of the determined specific damper speeds (DG) and on the basis of the determined specific damper accelerations (DA), and
    a generating module for generating a comparison result (VE) from a comparison of the acquired specific damper work values (DA) with one another, and generating at least one specific status signal (SS) on the basis of the comparison result (VE) for the at least two wheel carriers.

* * * * *